United States Patent
Nakajima et al.

(10) Patent No.: US 7,153,570 B2
(45) Date of Patent: *Dec. 26, 2006

(54) OPTICAL FIBER CORD

(75) Inventors: Fuminori Nakajima, Tokyo (JP); Nobuhisa Ishii, Tokyo (JP); Masao Tachikura, Tokyo (JP); Shigenori Uruno, Tokyo (JP); Hisashi Izumita, Tokyo (JP); Hitoshi Ishimaru, Yamato (JP); Kuniaki Yamaguchi, Yamato (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/990,099

(22) Filed: Nov. 15, 2004

(65) Prior Publication Data

US 2005/0069273 A1 Mar. 31, 2005

Related U.S. Application Data

(63) Continuation-in-part of application No. 09/786,100, filed as application No. PCT/JP00/04267 on Jun. 28, 2000, now Pat. No. 6,893,719.

(30) Foreign Application Priority Data

| Jun. 30, 1999 | (JP) | ............................... 11-186000 |
| Feb. 23, 2000 | (JP) | ............................... 2000-46496 |

(51) Int. Cl.
*G02B 6/44* (2006.01)

(52) U.S. Cl. ...................... 428/375; 428/364; 428/394; 385/102; 385/105

(58) Field of Classification Search ................ 428/375, 428/394, 364; 524/100; 385/102, 105; 350/96.03
See application file for complete search history.

(56) References Cited

U.S. PATENT DOCUMENTS

| 4,779,953 | A | 10/1988 | Ohta et al. ............... 350/96.23 |
| 5,256,714 | A | 10/1993 | Liu et al. |
| 5,344,855 | A | 9/1994 | Narita et al. ................. 523/179 |
| 5,430,081 | A | 7/1995 | Ohmae et al. .............. 524/100 |
| 5,684,071 | A | 11/1997 | Mogami et al. ............ 524/100 |
| 5,852,082 | A | 12/1998 | Uchida et al. .............. 524/101 |
| 6,025,423 | A | 2/2000 | Breant ........................ 524/412 |
| 6,185,350 | B1 * | 2/2001 | Tachikura et al. .......... 385/102 |
| 6,893,719 | B1 * | 5/2005 | Nakajima et al. ........... 428/375 |
| 2003/0180017 | A1 * | 9/2003 | Hayano et al. ............. 385/100 |

FOREIGN PATENT DOCUMENTS

| JP | 62-38611 | 3/1987 |
| JP | 63-213809 | 9/1988 |

(Continued)

*Primary Examiner*—Marie Yamnitzky
*Assistant Examiner*—Camie S. Thompson
(74) *Attorney, Agent, or Firm*—Knobbe Martens Olson & Bear LLP

(57) ABSTRACT

An optical fiber cord which is a single core optical fiber cord having an outer diameter of 1.2 mm or less, and has a structure in which an optical fiber core wire having a resin coating is provided at the center, a tensile-strength-fiber layer is provided around the outer periphery of the optical fiber core wire, and a coating layer is further provided around the outer periphery of the tensile-strength-fiber layer, wherein the coating layer is composed of a non-halogen fire-retardant resin, is disclosed. This optical fiber cord has excellent fire retardant, mechanical and handling properties, although the outer diameter thereof is made smaller.

6 Claims, 1 Drawing Sheet

FOREIGN PATENT DOCUMENTS

| | | |
|---|---|---|
| JP | 09-031267 | 2/1997 |
| JP | 09-33770 | 2/1997 |
| JP | 09-120023 | 5/1997 |
| JP | 10-10380 | 1/1998 |
| JP | 11-038281 | 2/1999 |
| JP | 2000-28875 | 1/2000 |
| JP | 2000-028875 | 1/2000 |

* cited by examiner

OPTICAL FIBER CORD

CROSS REFERENCE TO RELATED APPLICATIONS

This application is a continuation-in-part of U.S. patent application Ser. No. 09/786,100 filed May 21, 2001, now U.S. Pat. No. 6,893,719, which is a 371 of PCT/JP00/04267, filed Jun. 28, 2000.

TECHNICAL FIELD

The present invention relates to an optical fiber cord used for system lines or the like in a bureau or premises. More specifically, the present invention relates to an optical fiber cord that has excellent fire-retardant, handling, mechanical, and transmission properties; that emits no harmful substances, such as dioxins, during incineration after being removed; and that hardly allows harmful substances, such as heavy metal compounds, to dissolve out in the reclamation process.

BACKGROUND ART

In recent years, as the demand for optical communication network has increased, system lines in a bureau or premises are required to contain a larger number of core cords therein. In order to allow lines to contain a larger number of core cords therein, a wide space has to be allocated for lines. However, as the space for lines in a bureau or premises is limited, making the respective diameters of optical fiber cords smaller is essential. It should be noted, however, that when the diameter of each optical fiber cord is made smaller, the optical fiber cords still need to be held in a loose state, so that a core wire does not buckle when the core wire is pushed into the optical fiber cord at the time of attaching a connector; and the mechanical properties, such as the tensile strength and bending rigidity of the optical fiber cord, still need to be kept at a predetermined level or higher, so that excellent handling properties are maintained in jumper ring, such as line-switching. In addition, as the optical fiber cords are used indoors, they must have an excellent fire-retardant property. Due to this, polyvinyl chloride (PVC) has conventionally been used as a coating material thereof.

As examples of efforts to make the diameter of optical fiber cord smaller, there are JP-A-10-10380 ("JP-A" means unexamined published Japanese patent application), JP-A-2000-28875, and the like. These examples are characterized in that the diameter of conventional optical fiber cord is made smaller.

On the other hand, in recent years, there has been a problem that, when a coating material containing polyvinyl chloride or a halogen-series fire-retardant agent is discarded without being properly treated, for example, a plasticizer and/or a heavy metal stabilizer, which have been blended in the coating material, dissolve out. In addition, another problem, that a large quantity of smoke and hazardous/corrosive gases are generated when such a coating material is burned, has been an issue. In particular, it has recently been reported that the coating material may be a source of dioxin.

In consideration of such an influence on the environment by a coating material containing PVC or a halogen-series fire-retardant agent, non-halogen fire-retardant coating material, in which metal hydrates are filled at a high concentration in a polyolefine-series resin component, has been studied, in place of the coating material containing halogens, such as polyvinyl chloride. As one example in which a non-halogen fire-retardant coating material is used for a coating material of an optical fiber core wire or an optical cord, there are JP-A-9-33770 etc. However, this conventional example is characterized in that it only attempts to make the conventional optical fiber cord fire-retardant by a non-halogen material, and it gave no consideration to other matters, including making the diameter of the optical fiber cord smaller.

When an optical fiber cord is coated with a composition in which metal hydroxides are filled at a high concentration, if the diameter of the optical fiber cord is made smaller, a base resin having relatively low elastic modulus must be used as the base resin of the coating material, so that the fire-retardant agent is blended at a high concentration and in an excellently dispersed manner. Accordingly, it has been difficult to obtain mechanical properties, such as bending rigidity, that are necessary for an optical fiber cord. In particular, in the case of the outer diameter of the optical fiber cord is 1.2 mm or less, when a single layer of a composition in which metal hydroxide is filled at a high concentration is used as the coating of the optical fiber cord, bending rigidity of a given level necessary for the optical fiber cord may not be obtained, or a problem that, when the optical fiber cord is held for a long time so as to have a constant bending diameter, the optical fiber cord tends to remain in a bent form even after the cord is released, may arise. Further, when jumper ring (switching of optical lines) of optical fiber cords is performed, an operation for pulling out desired optical fiber cord terminals from a bundle of densely lined optical fiber cords is necessitated. In order to avoid the occurrence of buckling of the cords during the operation, bending rigidity of a certain value or higher is necessary.

The present invention has been contrived to solve the aforementioned problems. An object of the present invention is to provide an optical fiber cord having a diameter that has been made smaller, to 1.2 mm or less, and having excellent fire-retardant, mechanical, and handling properties.

Other and further objects, features, and advantages of the invention will appear more fully from the following description, taken in connection with the accompanying drawings.

DISCLOSURE OF THE INVENTION

The aforementioned objects of the present invention can be achieved by the following invention.

Namely, the present invention provides:

(1) An optical fiber cord which is a single core optical fiber cord and has a structure in which an optical fiber core wire having a resin coating is provided at the center, a tensile-strength-fiber layer is provided around the outer periphery of the optical fiber core wire, and a coating layer is further provided around the outer periphery of the tensile-strength-fiber layer, wherein the coating layer is composed of a non-halogen fire-retardant resin;

(2) The optical fiber cord as stated in the above item (1), wherein the coating layer is formed by a composition in which 18–60 parts by mass of ammonium polyphosphate is blended with 100 parts by mass of a resin component containing at least one selected from the group consisting of polyamide-series thermoplastic resins, polyamide elastomer-series thermoplastic resins and polyester elastomer-series thermoplastic resins;

(3) The optical fiber cord as stated in the above item (2), wherein the ammonium polyphosphate is one that has been surface-treated;

(4) The optical fiber cord as stated in the above item (1), wherein the coating layer is formed by a composition in which 18–60 parts by mass of a fire retardant, which consists of ammonium polyphosphate and a nitrogen-containing compound, is blended with 100 parts by mass of a resin component containing at least one selected from the group consisting of polyamide-series thermoplastic resins, polyamide elastomer-series thermoplastic resins and polyester elastomer-series thermoplastic resins;

(5) The optical fiber cord as stated in the above item (4), wherein the ratio of said ammonium polyphosphate to the total amount of said ammonium polyphosphate and said nitrogen-containing compound is 50 mass % or more;

(6) The optical fiber cord as stated in the above item (5), wherein said ammonium polyphosphate is one that has been surface-treated.

According to the present invention having the aforementioned structure, an optical fiber cord having excellent fire retardant, mechanical, transmission and handling properties can be provided when the diameter of the optical fiber core wire or the optical cords is made smaller.

Best Mode for Carrying out the Invention

A preferable embodiment of an optical fiber cord according to the present invention will be described with reference to drawings.

Figure 1:
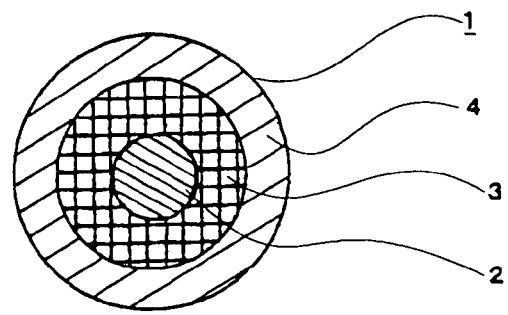
FIG. 1 is a sectional structural view showing one example of an optical fiber cord.

FIG. 1 is a sectional view of an optical fiber cord according to the present invention. In the drawing, 1 represents an optical fiber cord, 2 represents an optical fiber core wire, 3 represents a tensile strength fiber layer and 4 represents a coating layer as an outer coating.

The optical fiber core wire used in the present invention means an elemental wire which is an optical fiber itself, or it means an optical fiber core wire that has been subjected to a surface treatment, such as resin coating, thereon.

The optical fiber core wire having a resin coating thereon used in the present invention preferably has the outer diameter of 0.25–0.70 mm, and more preferably has the outer diameter of 0.4–0.6 mm. When the outer diameter is too small, the transmission loss caused by the bending of the optical fiber cord increases and the side pressure property significantly deteriorates. On the other hand, when the outer diameter of the optical fiber core wire is too large, it becomes difficult to achieve a loose structure with keeping the outer diameter of the optical fiber cord outer 1.2 mm or less. If the loose structure is not maintained, there is a possibility that buckling of the core wire occurs at the time of attaching a connector. Here, the "loose structure" means a state in which the core wire in the optical fiber cord does not closely attach to a tensile strength fiber or an outer coating provided around the outer periphery thereof, except that the core wire attaches to a tensile strength fiber or an outer coating due to frictional contact therebetween, and at the time of attaching a connector, the optical fiber core wire is pushed into the inside of the optical cord, without buckling, so as to be accommodated in the optical cord with a redundant portion thereof. In this case, if the amount of the tensile strength fiber is reduced in order to maintain the loose structure, the required tensile property may not be obtained. Therefore, it is generally preferable the maximum outer diameter of the core wire is 0.7 mm.

In addition, as the tensile strength fiber of the present invention, the aramid fiber (trade name: Kevlar, Twaron and the like) and the PBO (polyparaphenylene benzobisoxazol) fiber (trade name: ZYLON) are preferably employed. In order to achieve the tensile property required for the optical fiber cord and the outer diameter dimension of the optical fiber cord of 1.2 mm or less, the tensile elastic modulus of the tensile strength fiber is preferably in the range of 70,000 to 120,000 MPa. Further, in order to evenly arrange the tensile strength fiber around the outer periphery of the core wire, the total amount of the tensile strength fiber in a state in which a plurality of fiber bundles thereof are provided around the core wire is preferably 100–220 mg/m (1000–2200 decitex). Among these tensile strength fibers, the PBO fiber has more than twice as much elasticity modulus as that of the aramid fiber and thus allows more freedom in designing the structure of the optical fiber cord.

In the present invention, the tensile strength fiber layer is provided around the outer periphery of the optical fiber core wire, as shown in FIG. 1. The tensile strength fiber layer is located between the optical fiber core wire at the center and the outer coating resin layer, is not brought into contact with the optical fiber core wire and the outer coating resin layer except that such a contact occurs due to the frictional contact between their surfaces, and is provided around the periphery of the optical fiber core wire in an un-intertwined (longitudinally attached) or intertwined manner. The area occupancy rate of the tensile strength fiber layer in the section of the optical fiber cord is not particularly limited, but preferably 10–70%, and more preferably 30–50%.

In the present invention, a thermoplastic resin which constitutes the outer periphery of the optical fiber core wire and the tensile strength fiber may be designed as a single layer or more than one layers. However, as the outer diameter of the optical fiber cord is to be 1.2 mm or less, the thickness of the coating layer as the outer coating is preferably 0.10–0.30 mm. In addition, the bending modulus of the base resin component of the coating material is preferably 500–1,300 MPa, in terms of the bending rigidity of the cord. When the thickness of the coating layer is too thin, the optical fiber cord tends to become flat, and the bending rigidity required for the optical fiber cord, which is 12.74 N·mm$^2$(1.3 kgf·mm$^2$) or more, is not likely to be obtained and the fire retardant property required for the optical fiber cord will not be obtained, either, although a coating material having bending modulus of 1,300 MPa or so is used.

On the other hand, when the coating layer is too thick, it becomes difficult to ensure the loose state of the core wire, which is required for the optical fiber cord. Further, when the bending modulus of the coating resin is 500 MPa or less, the bending rigidity, which is one of the mechanical properties necessary for the optical fiber cord, will be as small as less than 12.74 N·mm$^2$, although the thickness of the coating layer is made to be 0.30 mm. In this case, when the optical fiber cord is pulled at the right angle (90°) with respect to a connector in a state in which the connector is attached to the optical fiber cord, the bending radius at the connector boot portion may be small, thereby resulting in a possible increase in transmission loss. Due to the reason described above, the bending rigidity required for the optical fiber cord is 12.74 N·mm$^2$ or more.

In the present invention, the non-halogen fire retardant resin is intended to include resin compositions. Here, being "fire retardant" indicates that the substance has a property which meets the fire retardant property standardized in the horizontal flame test of JIS C 3005 as described below. In the present invention, the coating layer formed by the non-halogen fire retardant resin may be designed so as to have a single layer or a plurality of layers. In the coating layer, at least the outermost layer thereof (when the coating layer is formed by a single layer, the single layer itself) is preferably produced by: preparing a resin as a base which contains at least one type of resin selected from the group consisting of a polyamide-series thermoplastic resins, a polyamide elastomer-series thermoplastic resins or a polyester elastomer-series thermoplastic resins; and blending, to 100 parts by mass of the thermoplastic resin as the base, preferably 18–60 parts by mass, more preferably 25–50 parts by mass, and the most preferably 25–40 parts by mass of an ammonium polyphosphate-series fire retardant agent. When the amount of the ammonium polyphosphate-series fire retardant agent is too small, the fire retardant property of the optical fiber cord cannot be obtained. On the other hand, when the amount of the ammonium polyphosphate-series fire retardant agent is too much, the optical fiber cord, after being bent for a long period, tends to remain in a bent form, causing a trouble in the line-setting operation thereafter. In addition, the mechanical properties of the coating material significantly deteriorate in this case.

Examples of the ammonium polyphosphate-series fire retardant agent to be used include the trade name: "Hostaflam" (manufactured by Clariant K.K.); "TERRAJU" (manufactured by Chisso Corporation); and "Sumisafe PM" (manufactured by Sumitomo Chemical Co., Ltd.).

Ammonium polyphosphate itself is soluble to water. However, by employing ammonium polyphosphate powder which has been subjected to surface coating, this problem of water resistant property can be overcome. As an example of such a surface-treated ammonium polyphosphate, the aforementioned "TERRAJU" can be mentioned.

When melamine cyanurate, for example, is used as a nitrogen-series fire retardant agent together with ammonium polyphosphate as the phosphorus-series fire retardant, the fire retardant property is significantly enhanced. Therefore, it is possible to reduce the amount of the phosphorus-series fire retardant agent to be blended. Ammonium polyphosphate and the nitrogen-containing compound, as the fire retardant agent, are preferably used together as a mixture of both. As melamine cyanurate, "MC", which is manufactured by Nissan Chemical Industries., Ltd, and the like are available.

The phosphorus-series fire retardant agent is supposed to act such that phosphorus thereof and oxygen react with each other during combustion, thereby forming a film on the surface of the resin and blocking the supply of oxygen to the resin. In addition, the nitrogen-series fire retardant agent is supposed to act such that it is decomposed at the time of combustion, thereby generating nitrogen gas and making the atmosphere inactive. In the present invention, it is assumed that the phosphorus-series fire retardant and the nitrogen-series fire retardant act in a multiplicative manner, thereby significantly increasing the fire retardant property.

The total amount of the ammonium polyphosphate-series fire retardant agent and the nitrogen-containing compound-series fire retardant agent is 18–60 parts by mass, more preferably 25–50 parts by mass, and most preferably 25–40 parts by mass with respect to 100 parts by mass of the base resin. When the amount of the fire retardant agent is too small, the satisfactory fire retardant property may not be obtained. When the amount of the fire retardant agent is too much, the optical fiber cord, after being bent, tends to remain in a bent form.

In addition, when the ammonium polyphosphate-series fire retardant agent and the nitrogen-containing compound-series fire retardant agent are used in a mixed state, the ratio of ammonium polyphosphate to the total amount of ammonium polyphosphate and the nitrogen-containing compound is preferably at least 50 mass % or more, and more preferably at least 60 mass % or more. When the ratio is less than 50 mass %, as the amount of the fire retardant agent which is blended into the composition is small, it is necessary to blend the fire retardant agent such that the amount thereof as a whole exceeds the aforementioned 60 parts by mass, in terms of the fire retardant property. As a result, the optical fiber cord, after being held in a bent form for a long period, tends to remain in a bent form after being released, thereby potentially causing a trouble to the line-setting operation thereafter. Further, the mechanical properties of the coating material also significantly deteriorate.

It should be noted that, the fire retardant property is enhanced not only when melamine cyanurate is mixed with ammonium polyphosphate, but also when other nitrogen-containing compounds such as polyphosphoric acid amide, tris-(2-hydroxyethyl) isocyanate, and melamine are mixed with ammonium polyphosphate. Further, when these nitrogen-containing compounds are used in a mixed manner, an effect, which is substantially the same as that achieved when melamine cyanurate is mixed, is likely to be obtained.

In the present invention, as the polyamide-series resin used as the base resin of the coating material, nylon(polyamide) 12 is preferable in terms of the bending modulus property of the material itself. A polyamide elastomer-series thermoplastic resin is a block copolymerized elastomer composed of polyamide and polyether. Examples of such a polyamide elastomer-series thermoplastic resin includes "Diamide PAE" (manufactured by DAICEL-HÜLS Ltd.), "Grilon ELX, Griamid ELY" (manufactured by EMS-CHEMIE). Using nylon 12 and the nylon elastomer in a mixed manner does not cause any particular problem.

One example of the polyester elastomer-series thermoplastic resin is a block copolymerized elastomer formed by polyester and polyether, of which specific examples include "Hytrel" (manufactured by Du Pont-Toray Co., Ltd.), "Pelprene" (manufactured by Toyobo Co., Ltd.) and the like. With respect to the polyester elastomer, a number of products having different grades of bending modulus are commercially available. Using these products of polyester elastomer in a mixed manner does not cause any particular problem.

The bending modulus of the resin which is the base such as nylon 12 and polyester elastomer is 500–1300 MPa. When the bending modulus of the base resin is less than 500 MPa, the bending rigidity of the cord of 12.74 N·mm$^2$ or more cannot be obtained. It should be noted that the bending modulus of the commonly used nylon 12 is 1300 MPa or less.

The higher the elastic modulus of the coating material of the optical fiber cord is, for example, the more the cord is likely to remain in a bent form when the cord is released after being held in for a long period a state in which the cord is wound around a bobbin or the like.

When a case in which polyester elastomer is used as the base material is compared with a case in which nylon 12 is used as the base material, with the same amount of the fire retardant agent blended thereto, or when the polyester elastomer-used base material is compared with the nylon-used base material at the substantially the same bending modulus with respect to the coating material to which the fire retardant agent has been blended, it is understood, as a result of the study of such comparisons, that the polyester elastomer-used base material is less likely to remain in a bent form after being released from a bent state. If the base material is in a state to remain in a bent form, the line-setting operation thereafter is more likely to have troubles. Therefore, the polyester elastomer is more preferable as the base material in terms of the operation property.

According to the optical fiber cord having the structure of the present invention, the mechanical, fire retardant, handling properties required for an optical fiber cord can be enhanced and an optical fiber cord which is more reliable can be provided.

The present invention will be described in more detail based on examples given below, but the present invention is not meant to be limited by these examples.

EXAMPLES

Examples 1–12 and Comparative Examples 1–8

An optical fiber having a structure shown in FIG. 1 was produced as follows such the that thermoplastic resin component and the fire retardant agent were blended according to the blending ratio shown in Table 1 and Table 2 below (the blending ratio is expressed as a relative "parts by mass" value in which the resin component is 100).

A ultraviolet light hardenable resin coating having tensile modulus of 1200 MPa was provided on an optical fiber elemental wire whose outer diameter was 0.25 mm, thereby forming a core wire whose outer diameter was 0.5 mm. As a tensile strength fiber, three pieces of Kevlar K49 (42 mg/m) were used. An optical fiber cord whose outer diameter was 1.1 mm was produced, and various evaluations were carried out as follows. The results are shown in Table 1 and Table 2.

The evaluation method was carried out as follows.

(1) Bending Rigidity

Figure 2:
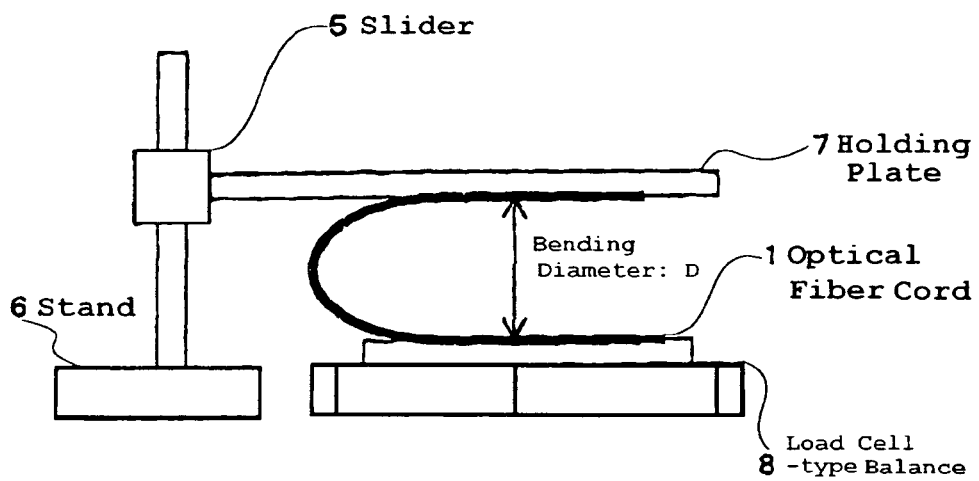
FIG. 2 is an explanatory view showing an evaluation method of bending rigidity of the optical fiber cord.

Bending rigidity was measured and evaluated as follows. Accordingly, as shown in FIG. 2, the optical fiber cord 1 of which length was 15 cm was bent so as to have a bending radius D (=30 mm), the resilient force W (N) which was applied by the bending was measured by a load cell balance 8, and the bending rigidity E1 was calculated according to the following formula (1).

$$\text{Bending Rigidity } E1 \, (N \cdot mm^2) = 0.3483 \, WD^2 \quad (1)$$

(2) Burning Property

The burning property was determined by: carrying out the horizontal flame test of JIS C 3005 five times; evaluating the case in which burning was naturally extinguished within 180 seconds for all of the tested optical fiber cords as "◯"; and evaluating the case in which burning continued more than 180 seconds in at least one of the tested optical fiber cord as "x".

(3) 90° Bending Test

Figure 3:
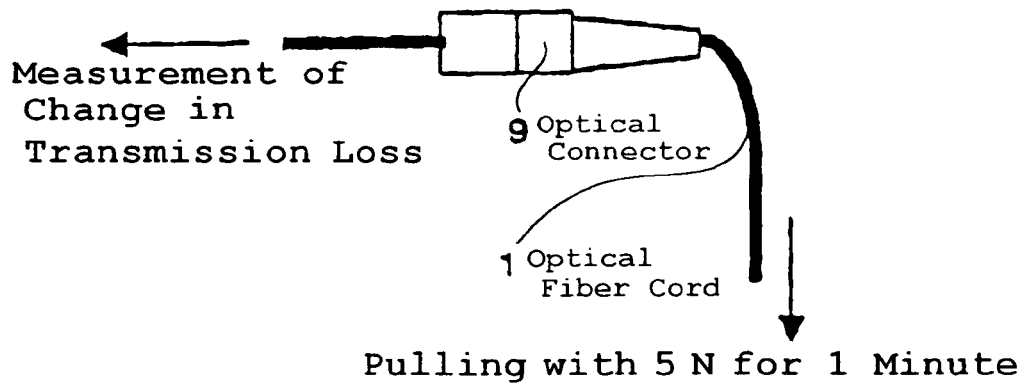
FIG. 3 is an explanatory view of showing a method of 90° bending test of an optical fiber cord having a connector.

The 90° bending test was carried out by: pulling the optical fiber cord at the right angle with respect to an optical connector 9 as shown in FIG. 3 and holding the optical fiber cord in that state for 1 minute at the load of 5 N; evaluating the case in which the maximum value of the loss increase at the measured wavelength of 1.55 µm was 0.2 dB or less as "◯"; and evaluating the case in which the maximum value of the loss increase at the measured wavelength of 1.55 µm exceeded 0.2 dB as "x".

(4) Remaining of a Bent Form

The degree in which the optical fiber cord remained in a bent form after being released in a bent state described below was determined by: preparing a sample of the optical fiber cord of which length was 25 cm; tightly winding the sample around a mandrel having 14 mm φ five times and fixing the both ends by a tape; peeling off the tape and pulling out the mandrel after leaving the sample for 5 minutes in the room temperature; leaving the optical fiber cord for 120 minutes; measuring the curvature radius at the bent portion; evaluating the case in which the curvature radius was 40 mm or more as "o"; evaluating the sample in which the curvature radius was 30 mm or more as "◯"; and evaluating the sample in which the curvature radius was smaller than 30 mm as "x".

(5) Water Resistance

As the optical fiber cord is used indoors, it is not so important that the optical fiber cord is excellent in water resistance. However, in case the optical fiber cord is immersed in water, there is a possibility that the appearance of the optical fiber cord differs depending on the water resistant property thereof. Therefore, the following test was conducted.

An optical fiber cord was immersed in pure water at 25° C. for 2 hours. The optical fiber cord was then taken out of water, had the cord surface thereof dried by a dryer, and presence/absence of precipitates on the cord surface was observed. The sample in which any precipitate was observed was evaluated as "x"., and The sample in which no precipitate was observed was evaluated as "◯".

TABLE 1

|  |  | Bending Modulus | Example 1 | Example 2 | Example 3 | Example 4 | Example 5 | Example 6 |
| --- | --- | --- | --- | --- | --- | --- | --- | --- |
| Nylon 12 | L2140 | 1100 MPa | 100 |  |  |  | 100 |  |
| Polyamide Elastomer | X4442 | 500 MPa |  |  |  |  |  | 100 |
| Polyester Elastomer | HTC2751 | 1280 MPa |  |  |  |  |  |  |
|  | HTC7247 | 600 MPa |  | 100 |  | 100 |  |  |
|  | HTC7277 | 550 MPa |  |  | 100 |  |  |  |
|  | HTC4767 | 110 MPa |  |  |  |  |  |  |
|  | HTC4057 | 60 MPa |  |  |  |  |  |  |
| Ammonium Polyphosphate | AP422 |  |  | 40 | 40 |  |  |  |
|  | AP462 |  |  |  |  |  |  |  |
|  | AP745 |  |  |  |  |  | 25 | 60 |
|  | AP750 |  |  |  |  | 40 |  |  |
|  | TERRAJU C60 |  |  |  |  |  | 30 |  |

TABLE 1-continued

| | | | | | | | | |
|---|---|---|---|---|---|---|---|---|
| Melamine Cyanurate | MC640 | | | | | | | |
| Properties | Bending Rigidity (N · mm²) | | 20.58 | 15.68 | 16.66 | 19.60 | 24.50 | 12.74 |
| | Burning Test | | ○ | ○ | ○ | ○ | ○ | ○ |
| | 90° Bending | | ○ | ○ | ○ | ○ | ○ | ○ |
| | 14φ Bending Tendency | | ○ | ⊚ | ⊚ | ⊚ | ○ | ○ |
| | Water Resistance | | X | X | X | ○ | X | X |

| | | Bending Modulus | Example 7 | Example 8 | Example 9 | Example 10 | Example 11 | Example 12 |
|---|---|---|---|---|---|---|---|---|
| Nylon 12 | L2140 | 1100 MPa | | | | | | |
| Polyamide Elastomer | X4442 | 500 MPa | | | | | | |
| Polyester Elastomer | HTC2751 | 1280 MPa | | | 100 | 80 | | |
| | HTC7247 | 600 MPa | 100 | | | | | |
| | HTC7277 | 550 MPa | | 100 | | | 100 | 100 |
| | HTC4767 | 110 MPa | | | | 20 | | |
| | HTC4057 | 60 MPa | | | | | | |
| Ammonium Polyphosphate | AP422 | | 15 | | 15 | | | |
| | AP462 | | | | | 15 | | |
| | AP745 | | | 40 | | | | |
| | AP750 | | | | | | | |
| | TERRAJU C60 | | 30 | | | | 15 | 18 |
| Melamine Cyanurate | MC640 | | | | 10 | 10 | 10 | |
| Properties | Bending Rigidity (N · mm²) | | 14.70 | 16.66 | 18.62 | 16.66 | 15.68 | 15.68 |
| | Burning Test | | ○ | ○ | ○ | ○ | ○ | ○ |
| | 90° Bending | | ○ | ○ | ○ | ○ | ○ | ○ |
| | 14φ Bending Tendency | | ○ | ⊚ | ⊚ | ⊚ | ⊚ | ⊚ |
| | Water Resistance | | X | X | X | ○ | ○ | ○ |

TABLE 2

| | | Bending Modulus | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|
| Nylon 12 | L2140 | 1100 MPa | 100 | 100 | | | | | | |
| Polyamide Elastomer | X4442 | 500 MPa | | | | | | | 100 | |
| Polyester Elastomer | HTC2751 | 1280 MPa | | | | | | | | |
| | HTC7247 | 600 MPa | | | | 100 | | | | |
| | HTC7277 | 550 MPa | | | 100 | | | | | 100 |
| | HTC4767 | 110 MPa | | | | | 100 | | | |
| | HTC4057 | 60 MPa | | | | | | | | |
| Polyolefine | EEA | 17 MPa | | | | | | 100 | | |
| Ammonium Polyphosphate | AP422 | | 15 | 80 | 15 | 80 | | | 8 | |
| | AP462 | | | | | | | | | 5 |
| | AP745 | | | | | | | | | |
| | AP750 | | | | | | | | | |
| | TERRAJU C60 | | | | | | | | | |
| Melamine Cyanurate | MC640 | | | | | | | | 10 | 13 |
| Metal Hydroxide | Kisma 5A | | | | | | 100 | 150 | | |
| Properties | Bending Rigidity (N · mm²) | | 25.48 | 23.52 | 12.74 | 13.72 | 8.82 | 6.86 | 13.72 | 15.68 |
| | Burning Test | | X | ○ | X | ○ | X | ○ | X | X |
| | 90° Bending | | ○ | ○ | ○ | ○ | X | X | ○ | ○ |
| | 14φ Bending Tendency | | ○ | X | ⊚ | X | ○ | ○ | ○ | ⊚ |

TABLE 2-continued

| | Bending Modulus | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Water Resistance | | X | X | X | X | ○ | ○ | X | X |

The thermoplastic resin components shown in Tables 1–2 each had the following bending modulus.

| | Bending Modulus |
|---|---|
| Polyamide: L2140 (Nylon 12 manufactured by DAICEL-HÜLS Ltd.) | 1,100 MPa |
| Polyamide Elastomer: X4442 (manufactured by DAICEL-HÜLS Ltd.) | 500 MPa |
| Polyester Elastomer A: HTC2751 (manufactured by Du Pont-Toray Co., Ltd.) | 1,300 MPa |
| Polyester Elastomer B: HTC7247 (manufactured by Du Pont-Toray Co., Ltd.) | 600 MPa |
| Polyester Elastomer C: HTC7277 (manufactured by Du Pont-Toray Co., Ltd.) | 550 MPa |
| Polyester Elastomer D: HTC4767 (manufactured by Du Pont-Toray Co., Ltd.) | 110 MPa |
| Polyester Elastomer E: HTC4057 (manufactured by Du Pont-Toray Co., Ltd.) | 60 MPa |
| Ethylene Ethylacrylate (EEA): A714 (manufactured by Du Pont-Mitsui Chemical Corporation) | 17 MPa |

In addition, the following products were used as the fire retardant agent:

The trade name: "HostaflamAP422" (manufactured by Clariant K.K.) as ammonium polyphosphate.

The trade name: "HostaflamAP462" (manufactured by Clariant K.K.), the trade name: "TERRAJU C60" (manufactured by Chisso Corporation) as the substance produced by carrying out, to ammonium polyphosphate, surface-coating treatment with a thermosetting resin such as melamine.

The trade name: "HostaflamAP745", "HostaflamAP750" (manufactured by Clariant K.K.), as ammonium polyphosphate in which "HostaflamAP422" was treated so as to contain a nitrogen-series compound such as tris-(2-hydroxyethyl)-isocyanurate in a manner that the amount of the nitrogen-series compound was less than 50 mass % of the total amount of "HostaflamAP422" and the nitrogen-series compound in a mixed state.

As the nitrogen-series fire retardant, melamine cyanurate of trade name: "MC640" (manufactured by Nissan Chemical Industries., Ltd) was used.

As the metal hydroxide-series fire retardant agent, trade name: "Kisma 5A" (manufactured by Kyowa Kagaku Co.) was used.

The following matters are shown by the results of Table 1 and Table 2.

In Examples 1, 2 and 3, the optical fiber cord coating whose outer diameter was 1.1 mm satisfies all of the properties required for an optical fiber cord as the bending rigidity, burning, 90° bending, and degree of bending tendency properties. In addition, in the bending tendency property, when the nylon 12-based sample of example 1 is compared with the polyester elastomer-based samples of example 2 and example 3, it is understood that, in a case in which the same fire retardant agent is blended by the same parts, the polyester elastomer-based samples of example 2 and example 3 are less likely to remain in a bent form after being released from a bent state.

Example 4 and example 12 are the cases in which the product obtained by blending surface-treated ammonium polyphosphate into the base resin was used. In these cases, satisfactory fire retardant property was obtained, although only 18–30 parts by mass of above-mentioned ammonium polyphosphate was blended. In addition, by the results of the water resistance, it is understood that surface-treated ammonium polyphosphate exhibits excellent water resistance.

Examples 5, 6, 7 and 8 are examples of the cases in which the mixture of ammonium polyphosphate and the nitrogen-containing compound was used as the fire retardant agent. In these cases, it is understood that the properties of the optical fiber cord can be satisfied by blending 18–60 parts by mass of the mixture.

Examples 9, 10 and 11 are the cases in which the mixture of ammonium polyphosphate and melamine cyanurate was used as the fire retardant agent such that the ratio of ammonium polyphosphate to the fire retardant agent mixture of 25 parts by mass was 50 mass % or more. It is understood that, when such a composition is used for coating, an optical fiber cord having excellent properties can be obtained. Among these examples, Example 10 is a case in which two types of polyester elastomers having different elastic modulus from each other were blended as the base resins. And, it is understood that satisfactory optical fiber cord properties were obtained in this example. Further, it is understood that the optical fiber cords employing surface-treated ammonium polyphosphate such as those of example 10 and 11 exhibit excellent water resistance.

Comparative example 1 is the case in which a polyamide resin was used as the base resin and 15 parts by mass of ammonium polyphosphate was blended. Comparative example 1 is a comparative example of the invention defined by claim 2 of the present invention. In Comparative example 1, the fire retardant property, among the properties required for an optical fiber cord, is not passed.

Comparative example 2 is the case in which a polyamide resin was used as the base resin and 80 parts by mass of ammonium polyphosphate was blended. Comparative example 2 is a comparative example of the invention defined by claim 2 of the present invention. In Comparative example 2, the resulting optical fiber cord exhibits excellent burning property but tends to remain in a bent form after being released from a bent state.

Comparative examples 3 and 4 are the cases in which polyester elastomer was used as the base resin of Comparative examples 1 and 2. Comparative examples 3 and 4 are comparative examples of the invention defined by claim 2 of the present invention. In Comparative examples 3 and 4, when the parts by mass of ammonium polyphosphate which is blended into the composition is less than 18 parts by mass, the fire retardant property is not satisfactory. When the parts by mass of ammonium polyphosphate which is blended into the composition more than 60 parts by mass, the resulting optical fiber cord tends to remain in a bent form after being released from a bent state.

Comparative example 5 is the case in which 100 parts by mass of polyester elastomer whose bending modulus was 200 Mpa or less and 100 parts by mass of Mg(OH)2, which is one of the metal hydroxides, were blended. Comparative example 5 is a comparative example of the invention defined by claim 2 or claim 4 of the present invention. In Comparative example 5, the resulting optical fiber cord exhibits poor bending rigidity as well as increase of loss in 90° bending test.

Comparative example 6 employs, as a coating of the optical fiber cord, a composition in which ethylene ethyl acrylate (EEA), which is one of the polyolefine resins, was used as the base resin and 150 parts by mass of Mg(OH)2, which is a metal hydroxide, was blended. Comparative example 6 is a comparative example of the invention defined by claim 2 or claim 4 of the present invention. In Comparative example 6, in a manner similar to Comparative example 5, the resulting optical fiber cord exhibits poor bending rigidity as well as increase of loss in 90° bending test.

It should be noted that, in Comparative examples 5 and 6, when the outer diameter of the optical fiber cord was made to be 1.5 mm by increasing the resin layer thickness of the outer coating, the bending rigidity of the example sufficiently exceeded 12.74 N·mm$^2$, thereby eliminating the bending-related problems.

Comparative examples 7 and 8 are the cases in which the ratio of ammonium polyphosphate to the mixture of ammonium polyphosphate and melamine cyanurate was no higher than 50 mass %. Comparative examples 7 and 8 are a comparative example of the invention defined by claim 5 of the present invention. In Comparative examples 7 and 8, the resulting optical fiber cord exhibited unsatisfactory fire retardant property, although 18 part by mass of the fire retardant agent was blended.

INDUSTRIAL APPLICABILITY

The optical fiber cord of the present invention is excellent in the mechanical, fire retardant and handling properties which are required for an optical fiber cord, and thus preferably used as a highly reliable optical fiber cord.

Having described our invention as related to the present embodiments, it is our intention that the invention not be limited by any of the details of the description, unless otherwise specified, but rather be construed broadly within its spirit and scope as set out in the accompanying claims.

What is claimed is:

1. An optical fiber cord which is a single core optical fiber cord having a structure in which an optical fiber core wire having a resin coating is provided at the center, a tensile-strength-fiber layer is provided around the outer periphery of the optical fiber core wire, and a coating layer is further provided around the outer periphery of the tensile-strength-fiber layer,
    wherein the coating layer is composed of a non-halogen fire-retardant resin, and
    wherein the coating layer is formed by a composition in which 18–60 parts by mass of ammonium polyphosphate is blended with 100 parts by mass of a resin component containing at least one selected from the group consisting of polyamide-series thermoplastic resins, polyamide elastomer-series thermoplastic resins and polyester elastomer-series thermoplastic resins, and wherein the bending modulus of the resin component of the coating layer is 500 to 1,300 MPa.

2. The optical fiber cord as claimed in claim 1, wherein the ammonium polyphosphate is one that has been surface-treated.

3. An optical fiber cord which is a single core optical fiber cord having a structure in which an optical fiber core wire having a resin coating is provided at the center, a tensile-strength-fiber layer is provided around the outer periphery of the optical fiber core wire, and a coating layer is further provided around the outer periphery of the tensile-strength-fiber layer,
    wherein the coating layer is composed of a non-halogen fire-retardant resin, and
    wherein the coating layer is formed by a composition in which 18–60 parts by mass of a fire retardant, which consists of ammonium polyphosphate and a nitrogen-containing compound, is blended with 100 parts by mass of a resin component containing at least one selected from the group consisting of polyamide-series thermoplastic resins, polyamide elastomer-series thermoplastic resins and polyester elastomer-series thermoplastic resins, and wherein the bending modulus of the resin component of the coating layer is 500 to 1,300 MPa.

4. The optical fiber cord as claimed in claim 3, wherein the ratio of said ammonium polyphosphate to the total amount of said ammonium polyphosphate and said nitrogen-containing compound is 50 mass % or more.

5. The optical fiber cord as claimed in claim 4, wherein said ammonium polyphosphate is one that has been surface-treated.

6. The optical fiber cord as claimed in claim 3, wherein the nitrogen-containing compound is at least one selected from the group consisting of melamine cyanurate, polyphosphoric acid amide, tris-(2hydroxyethyl) isocyanate and melamine.

* * * * *

UNITED STATES PATENT AND TRADEMARK OFFICE
CERTIFICATE OF CORRECTION

PATENT NO.      : 7,153,570 B2                                    Page 1 of 1
APPLICATION NO. : 10/990099
DATED           : December 26, 2006
INVENTOR(S)     : Nakajima et al.

It is certified that error appears in the above-identified patent and that said Letters Patent is hereby corrected as shown below:

Column 11-12 line 3, (Col. 10) (Table 2), Below "Example 8" delete "X" and insert -- O --.

Signed and Sealed this

Twenty-second Day of July, 2008

JON W. DUDAS
*Director of the United States Patent and Trademark Office*